US012733664B2

(12) United States Patent
Xiang et al.

(10) Patent No.: US 12,733,664 B2
(45) Date of Patent: Sep. 15, 2026

(54) HYDROXY- AND METHOXY-SUBSTITUTED FLAVONES AND THEIR USE

(71) Applicant: Firmenich SA, Satigny (CH)

(72) Inventors: Wen-Juan Xiang, Shanghai (CN); Dan-Ting Yin, Shanghai (CN); Wen-Ting Zhu, Shanghai (CN)

(73) Assignee: Firmenich SA (CH)

( * ) Notice: Subject to any disclaimer, the term of this patent is extended or adjusted under 35 U.S.C. 154(b) by 288 days.

(21) Appl. No.: 18/262,515

(22) PCT Filed: Feb. 24, 2022

(86) PCT No.: PCT/EP2022/054598
§ 371 (c)(1),
(2) Date: Jul. 21, 2023

(87) PCT Pub. No.: WO2022/189155
PCT Pub. Date: Sep. 15, 2022

(65) Prior Publication Data

US 2024/0114939 A1 Apr. 11, 2024

(30) Foreign Application Priority Data

Mar. 9, 2021 (WO) ................ PCT/CN2021/079733
Mar. 23, 2021 (EP) .................................... 21164343

(51) Int. Cl.
*A23L 27/20* (2016.01)
*A23L 27/00* (2016.01)

(52) U.S. Cl.
CPC ........... *A23L 27/2052* (2016.08); *A23L 27/84* (2016.08); *A23L 27/86* (2016.08); *A23L 27/88* (2016.08)

(58) Field of Classification Search
CPC ........... A23L 27/86; A23L 27/84; A23L 27/88
See application file for complete search history.

(56) References Cited

U.S. PATENT DOCUMENTS 5,580,545 A 12/1996 Washino et al.
6,468,576 B1 10/2002 Sher
8,076,491 B2 12/2011 Karanewsky
8,124,121 B2 2/2012 Tachdjian
(Continued)

FOREIGN PATENT DOCUMENTS

CN 101820778 9/2010
JP 2007289159 11/2007
(Continued)

OTHER PUBLICATIONS

International Search Report and Written Opinion for corresponding International Application No. PCT/EP2022/054598 dated Jul. 1, 2022 (15 pages).

*Primary Examiner* — Michele L Jacobson
(74) *Attorney, Agent, or Firm* — Knobbe, Martens, Olson & Bear, LLP

(57) ABSTRACT

The present disclosure generally provides uses of certain mixed hydroxy- and methoxy-substituted flavones (HMFs) to reduce bitterness, astringency, or sourness, or to enhance sweetness of a ingestible composition, such as a flavored food or beverage product. In some embodiments, the disclosure provides uses of the HMFs disclosed herein to reduce the unpleasant taste of limonin, nomelin, or naringin, which can be present at elevated levels in certain *citrus* products.

8 Claims, 1 Drawing Sheet

(56) References Cited

U.S. PATENT DOCUMENTS

| | | | | |
|---|---|---|---|---|
| 8,445,692 | B2 | 5/2013 | Karanewsky | |
| 8,541,421 | B2 | 9/2013 | Tachdjian | |
| 8,592,592 | B2 | 11/2013 | Tachdjian | |
| 8,735,081 | B2 | 5/2014 | Li | |
| 8,815,956 | B2 | 8/2014 | Tachdjian | |
| 8,877,922 | B2 | 11/2014 | Tachdjian | |
| 8,968,708 | B2 | 3/2015 | Tachdjian | |
| 9,000,051 | B2 | 4/2015 | Feltin | |
| 9,000,054 | B2 | 4/2015 | Tachdjian | |
| 9,247,759 | B2 | 2/2016 | Karanewsky | |
| 9,394,287 | B2 | 7/2016 | Priest | |
| 9,834,544 | B2 | 12/2017 | Tachdjian | |
| 9,840,789 | B2 | 12/2017 | Zhang | |
| 10,421,727 | B2 | 9/2019 | Chumakova | |
| 2007/0275106 | A1 | 11/2007 | Ho | |
| 2011/0159151 | A1 | 6/2011 | Koike | |
| 2014/0039044 | A1* | 2/2014 | Ho | A61K 36/752 514/456 |
| 2017/0119032 | A1 | 5/2017 | Patron | |
| 2022/0236254 | A1* | 7/2022 | Servant | G01N 33/566 |

FOREIGN PATENT DOCUMENTS

| | | | |
|---|---|---|---|
| JP | 2010-041935 | | 2/2010 |
| JP | 2020-200245 | | 1/2020 |
| WO | 2012/107203 | A1 | 8/2012 |
| WO | WO 2012/146584 | | 11/2012 |
| WO | WO 2020/025639 | | 2/2020 |
| WO | WO 2020/074436 | | 4/2020 |

* cited by examiner

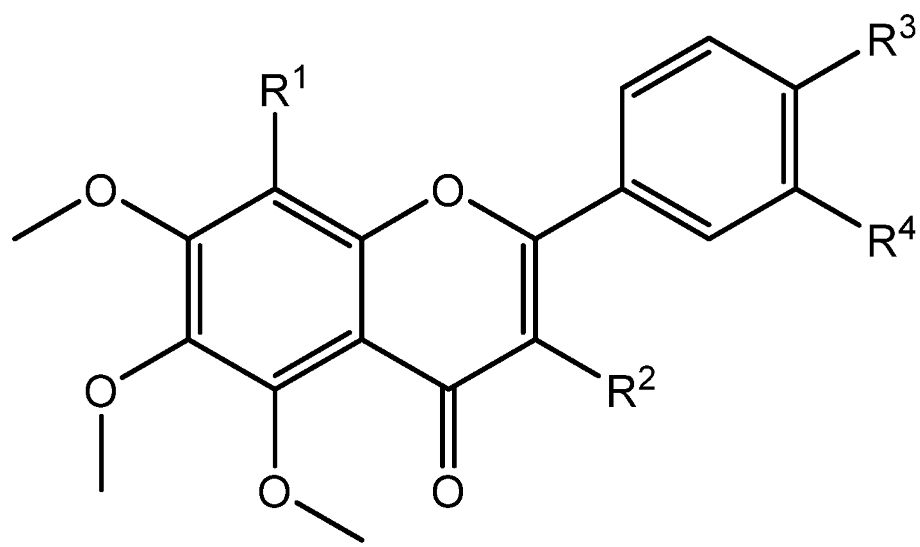

HYDROXY- AND METHOXY-SUBSTITUTED FLAVONES AND THEIR USE

TECHNICAL FIELD

The present disclosure generally provides uses of certain mixed hydroxy- and methoxy-substituted flavones (HMFs) to reduce bitterness, astringency, or sourness, or to enhance sweetness of a ingestible composition, such as a flavored food or beverage product. In some embodiments, the disclosure provides uses of the HMFs disclosed herein to reduce the unpleasant taste of limonin, nomilin, or naringin, which can be present at elevated levels in certain *citrus* products.

DESCRIPTION OF RELATED ART

The taste system provides sensory information about the chemical composition of the external world. Taste transduction is one of the more sophisticated forms of chemically triggered sensation in animals. Signaling of taste is found throughout the animal kingdom, from simple metazoans to the most complex of vertebrates. Mammals are believed to have five basic taste modalities: sweet, bitter, sour, salty, and umami.

Bitterness is one of the most sensitive of these five taste modalities, and people generally perceive bitterness as unpleasant, sharp, and disagreeable. A large number of bitter compounds are known to be toxic. Thus, an ability to detect bitter compounds at low concentrations provided a certain evolutionary advantages. Even so, a number of non-toxic food and beverage products contain bitter compounds, such as coffee, tea, green leafy vegetables, and *citrus* fruits. For many people, the concentration of bitter compounds in such foods and beverages falls below the level that induces an unpleasant reaction. But others may have a lower threshold for perceiving bitterness, and may experience reduced enjoyment when consuming these products. Adding sweeteners, such as sucrose, to such products can help to offset the bitterness. But adding sweeteners can increase the caloric content of the product, and may alter the taste too much for others who can easily withstand the mild natural bitterness of these products without sweetening.

Humans perceive bitterness when bitter compounds activate one or more of 25 different bitter taste receptors, which are generally located in the tongue. These bitter taste receptors are members of the T2R (taste receptor, type 2) family of receptors. Each of the 25 different bitter taste receptors contains a protein, whose sequence varies from one bitter taste receptor to another. Different bitter compounds may activate different groups of bitter taste receptors. Thus, compounds that block the bitterness of certain bitter compounds may not work effectively at blocking the bitterness of others.

Thus, there is a continuing need to discover compounds that can block the bitter taste receptors responsible for the tendency of humans to perceive certain *citrus* products as bitter.

SUMMARY

The present disclosure relates to the discovery that certain mixed hydroxy- and methoxy-substituted flavones (HMFs) work effectively to reduce bitterness, astringency, or sourness, and to enhance sweetness of a ingestible composition, such as a flavored food or beverage product.

In a first aspect, the disclosure provides uses of certain HMFs, to reduce a bitter taste of an ingestible composition. In some embodiments, the HMF compounds are compounds of formula (I), or comestibly acceptable salts thereof:

(I)

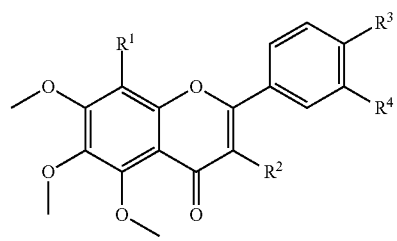

wherein:

$R^1$ is a hydrogen atom or methoxy;

$R^2$ is a hydrogen atom or methoxy;

$R^3$ is hydroxy or methoxy; and $R^4$ is a hydrogen atom, hydroxy, or methoxy;

provided that, when $R^3$ is hydroxy, $R^4$ is a hydrogen atom or methoxy, and when $R^3$ is methoxy, $R^4$ is hydroxy. In some embodiments thereof, the ingestible composition comprises one or more bitter compounds. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more bitter compounds. In some embodiments, the one or more bitter compounds include limonoids, such as limonin, nomilin, nomilinic acid, or any combination thereof. In some embodiments, the one or more bitter compounds include naringin.

In a second aspect, the disclosure provides uses of certain HMFs, to reduce an astringent taste of an ingestible composition. In some embodiments, the HMF compounds are compounds of formula (I), or comestibly acceptable salts thereof, as set forth above. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more astringent compounds.

In a third aspect, the disclosure provides uses of certain HMFs, to reduce a sour taste of an ingestible composition. In some embodiments, the HMF compounds are compounds of formula (I), or comestibly acceptable salts thereof, as set forth above. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sour compounds, such as citric acid, acetic acid, malonic acid, and the like.

In a fourth aspect, the disclosure provides uses of certain HMFs, to enhance a sweet taste of an ingestible composition. In some embodiments, the HMF compounds are compounds of formula (I), or comestibly acceptable salts thereof, as set forth above. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sweeteners.

In a fifth aspect, the disclosure provides uses of certain HMFs, to enhance mouthfeel of an ingestible composition. In some embodiments, the HMF compounds are compounds of formula (I), or comestibly acceptable salts thereof, as set forth above. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sweeteners.

In a sixth aspect, the disclosure provides methods of reducing a bitter taste of an ingestible composition, the method comprising introducing one or more HMFs to the ingestible composition. In some embodiments, the HMF compounds are compounds of formula (I), or comestibly acceptable salts thereof, as set forth above. In some embodiments thereof, the ingestible composition comprises one or more bitter compounds. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more bitter compounds. In some embodiments, the one or more bitter compounds include limonoids, such as limonin, nomilin, nomilinic acid, or any combination thereof. In some embodiments, the one or more bitter compounds include naringin.

In a seventh aspect, the disclosure provides methods of reducing an astringent taste of an ingestible composition, the method comprising introducing one or more HMFs to the ingestible composition. In some embodiments, the HMF compounds are compounds of formula (I), or comestibly acceptable salts thereof, as set forth above. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more astringent compounds.

In an eighth aspect, the disclosure provides methods of reducing a sour taste of an ingestible composition, the method comprising introducing one or more HMFs to the ingestible composition. In some embodiments, the HMF compounds are compounds of formula (I), or comestibly acceptable salts thereof, as set forth above. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sour compounds, such as citric acid, malonic acid, acetic acid, and the like.

In a ninth aspect, the disclosure provides methods of enhancing a sweet taste of an ingestible composition, the method comprising introducing one or more HMFs to the ingestible composition. In some embodiments, the HMF compounds are compounds of formula (I), or comestibly acceptable salts thereof, as set forth above. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sweeteners.

In a tenth aspect, the disclosure provides methods of enhancing mouthfeel of an ingestible composition, the method comprising introducing one or more HMFs to the ingestible composition. In some embodiments, the HMF compounds are compounds of formula (I), or comestibly acceptable salts thereof, as set forth above. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sweeteners.

In an eleventh aspect, the disclosure provides ingestible compositions comprising one or more HMFs. In some embodiments, the HMF compounds are compounds of formula (I), or comestibly acceptable salts thereof, as set forth above. In some embodiments, the one or more HMFs are present in the ingestible composition in a bitterness-reducing effective amount. In some embodiments thereof, the ingestible composition comprises one or more bitter compounds. In some embodiments thereof, the ingestible composition comprises one or more astringent compounds. In some embodiments thereof, the ingestible composition comprises one or more sour compounds. In some embodiments thereof, the ingestible composition comprises one or more sweeteners. In some embodiments thereof, the ingestible composition is a composition derived from *citrus* fruit. In some embodiments, the ingestible composition is a naturally occurring composition. In some other embodiments, the ingestible composition is a non-naturally occurring composition. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the bitter compounds are limonoids, such as limonin, nomilin, nomilinic acid, or any combination thereof. In some embodiments, the bitter compounds comprise naringin.

In a twelfth aspect, the disclosure provides flavored products comprising an ingestible composition of the eleventh aspect. In some embodiments, the flavored products are beverage products, such as soda, flavored water, tea, and the like. In some other embodiments, the flavored products are food products. In some embodiments, the flavored products are oral care products or chewing gum.

In a thirteenth aspect, the disclosure provides methods for reducing the bitterness of *citrus* compositions derived from *citrus* fruit having *citrus* greening disease, the method comprising: (a) deriving a *citrus* composition from *citrus* fruit, wherein at least a portion of the *citrus* fruit has *citrus* greening disease; and (b) introducing to the *citrus* composition a bitterness-reducing composition, which comprises HMFs, such as an amount (such as a bitterness-reducing effective amount) of HMFs. In some embodiments, the HMF compounds are compounds of formula (I), or comestibly acceptable salts thereof, as set forth above. In some embodiments, the *citrus* composition comprises an abnormally elevated concentration of one or more bitter compounds. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the bitter compounds are limonoids, such as limonin, nomilin, nomilinic acid, or any combination thereof. In some embodiments, the bitterness-reducing composition is derived from *citrus* waste.

Further aspects, and embodiments thereof, are set forth below in the Detailed Description, the Drawings, the Abstract, and the Claims.

BRIEF DESCRIPTION OF DRAWINGS

The following drawings are provided for purposes of illustrating various embodiments of the compositions and methods disclosed herein. The drawings are provided for illustrative purposes only, and are not intended to describe any preferred compositions or preferred methods, or to serve as a source of any limitations on the scope of the claimed inventions.

FIG. 1 shows HMF compounds that was discovered to have activity in reducing bitterness, reducing astringency, or enhancing sweetness of an ingestible composition, wherein: $R^1$ is a hydrogen atom or methoxy; $R^2$ is a hydrogen atom or methoxy; $R^3$ is hydroxy or methoxy; and $R^4$ is a hydrogen atom, hydroxy, or methoxy; provided that, when $R^3$ is hydroxy, $R^4$ is a hydrogen atom or methoxy, and when $R^3$ is methoxy, $R^4$ is hydroxy.

DETAILED DESCRIPTION

The following Detailed Description sets forth various aspects and embodiments provided herein. The description is to be read from the perspective of the person of ordinary skill in the relevant art. Therefore, information that is well known to such ordinarily skilled artisans is not necessarily included.

Definitions

The following terms and phrases have the meanings indicated below, unless otherwise provided herein. This disclosure may employ other terms and phrases not expressly defined herein. Such other terms and phrases have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

The term "bitter taste" refers to the activation of one or more T2R taste receptors by certain compounds in an ingestible composition. A "bitter receptor blocker" or "bitter blocker" refers to a compound that antagonizes the activation of one or more T2R receptors by a bitter compound. The reduction of bitter taste refers to the reduction (e.g., partial antagonism) of one or more T2R taste receptors that would otherwise be activated by one or more compounds in an ingestible composition.

The term "astringent taste" refers to a trigeminal effect that is perceived as dryness and as causing puckering. The reduction of astringent taste refers to the reduction of this trigeminal effect.

The term "sour taste" refers to the mildly unpleasant taste associated with organic acids, such as acetic acid (vinegar). The reduction of sour taste refers to the reduction of this unpleasant taste effect.

The term "sweet taste" refers to the activation of the T1R2/T1R3 taste receptors by certain compounds in an ingestible composition. A "sweet receptor enhancer" or "sweetness enhancer" refers to a compound that agonizes the activation of the T1R2/T1R3 taste receptor by a sweetener. The enhancement of sweet taste refers to the increase (e.g., agonism) of the T1R2/T1R3 taste receptor to a greater degree than it would otherwise be activated by one or more compounds in an ingestible composition.

The term "hydroxy- and methoxy-substituted flavones" or "HMFs" or "HMF compounds" refer to flavone compounds having one or more hydroxy substituents and one or more methoxy substituents, where the numberings follow the usual flavone numberings, as shown below:

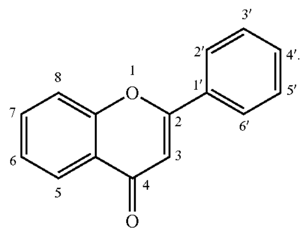 [SMILES: O=c1cc(-c2ccccc2)oc2ccccc12]

In some embodiments, the HMF compounds are compounds of formula (I), or comestibly acceptable salts thereof, as set forth above. Non-limiting examples include the following compounds, or their comestibly acceptable salts: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; and 3'-hydroxy-3,5,6,7,8,4'-hexamethoxyflavone.

As used herein, the singular forms "a," "an," and "the" include plural referents unless the context clearly dictates otherwise. For example, reference to "a substituent" encompasses a single substituent as well as two or more substituents, and the like.

As used herein, "hydroxy" refers to an —OH substituent, and "methoxy" refers to an —$OCH_3$ substituent.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "optionally" means that the subsequently described event(s) may or may not occur. In some embodiments, the optional event does not occur. In some other embodiments, the optional event does occur one or more times.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

Chemical structures are often shown using the "skeletal" format, such that carbon atoms are not explicitly shown, and hydrogen atoms attached to carbon atoms are omitted entirely. For example, the structure

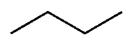

represents butane (i.e., n-butane). Furthermore, aromatic groups, such as benzene, are represented by showing one of the contributing resonance structures. For example, the structure

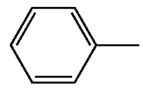

represents toluene.

Other terms are defined in other portions of this description, even though not included in this subsection.

Hydroxy- and Methoxy-Substituted Flavones (HMFs)

The present disclosure provides for the use of certain hydroxy- and methoxy-substituted, flavones. Any suitable flavones can be used, as long as they have one or more hydroxy substituent and one or more methoxy substituent. In some embodiments, the HMF compounds are compounds of formula (I), or comestibly acceptable salts thereof:

(I)

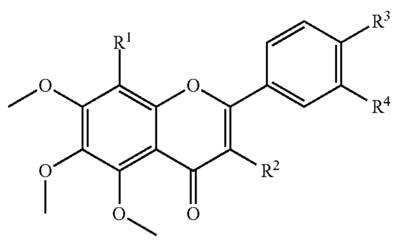

wherein:

$R^1$ is a hydrogen atom or methoxy;

$R^2$ is a hydrogen atom or methoxy;

$R^3$ is hydroxy or methoxy; and $R^4$ is a hydrogen atom, hydroxy, or methoxy;

provided that, when $R^3$ is hydroxy, $R^4$ is a hydrogen atom or methoxy, and when $R^3$ is methoxy, $R^4$ is hydroxy.

In some embodiments, $R^3$ is hydroxy. In some embodiments, $R^3$ is mothoxy.

In some embodiments, the HMFs are any of the compounds, whether taken alone or in combination with each other, of Compounds 101-110, or any comestibly acceptable salts thereof, in Table 1.

TABLE 1

| No. | Compound |
|---|---|
| 101 | 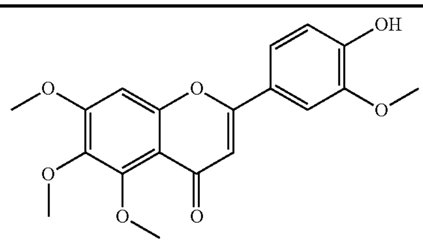 |
| 102 | 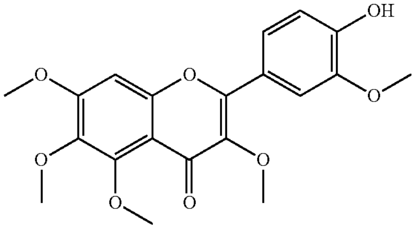 |
| 103 | 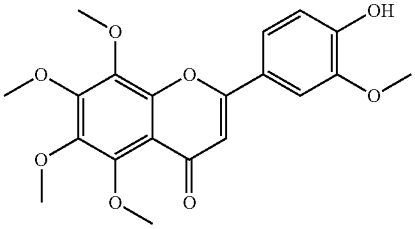 |
| 104 | 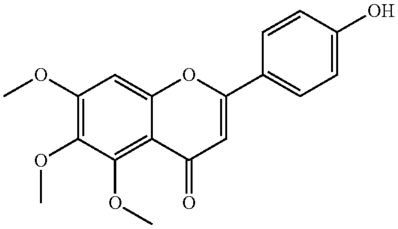 [SMILES: COc1cc2oc(-c3ccc(O)cc3)cc(=O)c2c(OC)c1OC] |

TABLE 1-continued

| No. | Compound |
|---|---|
| 105 | 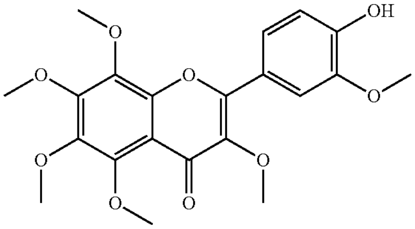 |
| 106 | 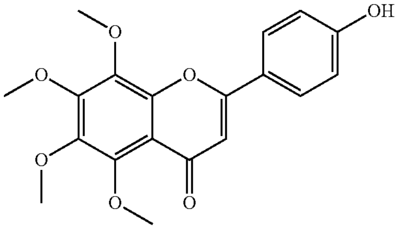 [SMILES: COc1c(OC)c(OC)c2c(=O)cc(-c3ccc(O)cc3)oc2c1OC] |
| 107 | 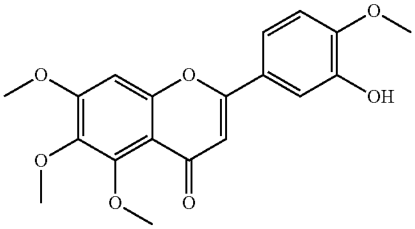 |
| 108 | 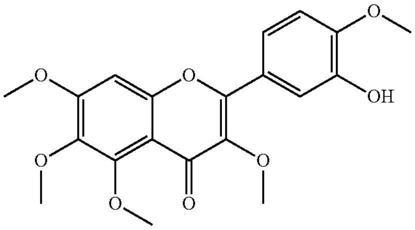 |
| 109 | 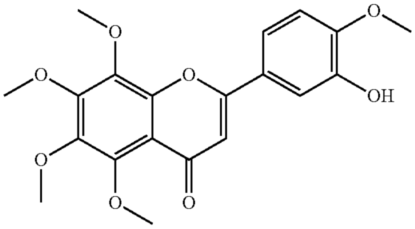 |
| 110 | 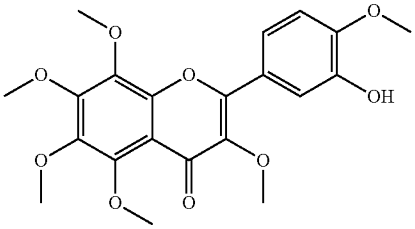 |

Where the HMF compounds disclosed herein have at least one chiral center, they may exist as individual enantiomers and diastereomers or as mixtures of such isomers. In some embodiments in connection with the second aspect, the sweet-enhancing compound has substantial enantiomeric purity.

Separation of the individual isomers or selective synthesis of the individual isomers is accomplished by application of various methods which are well known to practitioners in the art. Unless otherwise indicated (e.g., where the stereochemistry of a chiral center is explicitly shown), all such isomers and mixtures thereof are included in the scope of the compounds disclosed herein. Furthermore, compounds disclosed herein may exist in one or more crystalline or amorphous forms. Unless otherwise indicated, all such forms are included in the scope of the compounds disclosed herein including any polymorphic forms. In addition, some of the compounds disclosed herein may form solvates with water (i.e., hydrates) or common organic solvents. Unless otherwise indicated, such solvates are included in the scope of the compounds disclosed herein.

The skilled artisan will recognize that some structures described herein may be resonance forms or tautomers of compounds that may be fairly represented by other chemical structures, even when kinetically; the artisan recognizes that such structures may only represent a very small portion of a sample of such compound(s). Such compounds are considered within the scope of the structures depicted, though such resonance forms or tautomers are not represented herein.

Isotopes may be present in the compounds described. Each chemical element as represented in a compound structure may include any isotope of said element. For example, in a compound structure a hydrogen atom may be explicitly disclosed or understood to be present in the compound. At any position of the compound that a hydrogen atom may be present, the hydrogen atom can be any isotope of hydrogen, including but not limited to hydrogen-1 (protium) and hydrogen-2 (deuterium). Thus, reference herein to a compound encompasses all potential isotopic forms unless the context clearly dictates otherwise.

In some embodiments, the HMF compounds disclosed herein are capable of forming acid and/or base salts by virtue of the presence of amino and/or carboxyl groups or groups similar thereto. Comestibly acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Comestibly acceptable salts can be formed using inorganic and organic bases. Inorganic bases from which salts can be derived include, for example, bases that contain sodium, potassium, lithium, ammonium, calcium, magnesium, iron, zinc, copper, manganese, aluminum, and the like; particularly preferred are the ammonium, potassium, sodium, calcium and magnesium salts. In some embodiments, treatment of the compounds disclosed herein with an inorganic base results in loss of a labile hydrogen from the compound to afford the salt form including an inorganic cation such as $Li^+$, $Na^+$, $K^+$, $Mg^{2+}$ and $Ca^{2+}$ and the like. Organic bases from which salts can be derived include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. In some embodiments, the salts are comestibly acceptable salts, which are salts suitable for inclusion in ingestible compositions, such as food or beverage products. In some embodiments, the comestibly acceptable salts are sodium or potassium salts.

Uses and Methods

In certain aspects, the disclosure provides uses of certain HMFs, to reduce a bitter taste of an ingestible composition. In some embodiments, the HMF compounds are compounds of formula (I), or comestibly acceptable salts thereof, according to any of the preceding embodiments thereof. In some embodiments thereof, the ingestible composition comprises one or more bitter compounds. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the one or more bitter compounds include limonoids, such as limonin, nomilin, nomilinic acid, or any combination thereof. In some embodiments, the one or more bitter compounds include naringin.

In certain aspects, the disclosure provides uses of certain HMFs, to reduce an astringent taste of an ingestible composition. In some embodiments, the HMF compounds are compounds of formula (I), or comestibly acceptable salts thereof, according to any of the preceding embodiments thereof. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more astringent compounds.

In certain aspects, the disclosure provides uses of certain HMFs, to reduce a sour taste of an ingestible composition. In some embodiments, the HMF compounds are compounds of formula (I), or comestibly acceptable salts thereof, according to any of the preceding embodiments thereof. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sour compounds, such as citric acid, acetic acid, malonic acid, and the like.

In certain aspects, the disclosure provides uses of certain HMFs, to enhance a sweet taste of an ingestible composition. In some embodiments, the HMF compounds are compounds of formula (I), or comestibly acceptable salts thereof, according to any of the preceding embodiments thereof. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sweeteners.

In certain aspects, the disclosure provides uses of certain HMFs, to enhance mouthfeel of an ingestible composition. In some embodiments, the HMF compounds are compounds of formula (I), or comestibly acceptable salts thereof, according to any of the preceding embodiments thereof. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof.

In certain aspects, the disclosure provides methods of reducing a bitter taste of an ingestible composition, the method comprising introducing one or more HMFs to the ingestible composition. In some embodiments, the HMF compounds are compounds of formula (I), or comestibly acceptable salts thereof, according to any of the preceding embodiments thereof. In some embodiments thereof, the ingestible composition comprises one or more bitter compounds. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the one or more bitter compounds include limonoids, such as limonin, nomilin, nomilinic acid, or any combination thereof. In some embodiments, the one or more bitter compounds include naringin.

In certain aspects, the disclosure provides methods of reducing an astringent taste of an ingestible composition, the method comprising introducing one or more HMFs to the ingestible composition. In some embodiments, the HMF compounds are compounds of formula (I), or comestibly acceptable salts thereof, according to any of the preceding embodiments thereof. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more astringent compounds.

In certain aspects, the disclosure provides methods of reducing a sour taste of an ingestible composition, the method comprising introducing one or more HMFs to the ingestible composition. In some embodiments, the HMF compounds are compounds of formula (I), or comestibly acceptable salts thereof, according to any of the preceding embodiments thereof. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sour compounds, such as citric acid, malonic acid, acetic acid, and the like.

In certain aspects, the disclosure provides methods of enhancing a sweet taste of an ingestible composition, the method comprising introducing one or more HMFs to the ingestible composition. In some embodiments, the HMF compounds are compounds of formula (I), or comestibly acceptable salts thereof, according to any of the preceding embodiments thereof. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the ingestible composition comprises one or more sweeteners.

In certain aspects, the disclosure provides methods of enhancing mouthfeel of an ingestible composition, the method comprising introducing one or more HMFs to the ingestible composition. In some embodiments, the HMF compounds are compounds of formula (I), or comestibly acceptable salts thereof, according to any of the preceding embodiments thereof. In some embodiments thereof, the ingestible composition is a composition derived from *citrus* fruit. In some such embodiments, the HMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof.

The foregoing uses and methods generally involve the use of HMF compounds in a composition containing one or more additional ingredients. In certain embodiments of any aspects and embodiments set forth herein that refer to an ingestible composition, the ingestible composition is a non-naturally-occurring product, such as a composition specifically manufactured for the production of a flavored product, such as food or beverage product.

In certain embodiments, the disclosure provides ingestible compositions comprising one or more HMF compounds. In some embodiments, the HMF compounds are compounds of formula (I), or comestibly acceptable salts thereof, according to any of the preceding embodiments thereof. In some embodiments, the one or more HMF compounds are present in the ingestible composition in a bitterness-reducing effective amount. In some embodiments thereof, the ingestible composition comprises one or more bitter compounds. In some embodiments thereof, the ingestible composition comprises one or more astringent compounds. In some embodiments thereof, the ingestible composition comprises one or more sour compounds. In some embodiments thereof, the ingestible composition comprises one or more sweeteners. In some embodiments thereof, the ingestible composition is a composition derived from *citrus* fruit. In some embodiments, the ingestible composition is a naturally occurring composition. In some other embodiments, the ingestible composition is a non-naturally occurring composition. In some such embodiments, the HMF compounds are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the bitter compounds are limonoids, such as limonin, nomilin, nomilinic acid, or any combination thereof. In some embodiments, the bitter compounds comprise naringin.

The HMF compounds can be present in the ingestible composition in any suitable concentration. For example, in some embodiments, the HMF compound is present in the ingestible composition at a concentration ranging from 0.01 ppm to 1000 ppm, or from 0.01 ppm to 900 ppm, or from 0.01 ppm to 800 ppm, or from 0.01 ppm to 700 ppm, or from 0.01 ppm to 600 ppm, or from 0.1 ppm to 500 ppm, or from 0.1 ppm to 400 ppm, or from 0.1 ppm to 300 ppm, or from 0.1 ppm to 200 ppm, or from 1 ppm to 100 ppm, or from 1 ppm to 80 ppm, or from 1 ppm to 60 ppm, or from 1 ppm to 50 ppm, or from 1 ppm to 40 ppm.

The ingestible compositions set forth herein, whether as a composition or as part of a use or method, in some embodiments, comprise one or more bitter compounds. The bitter compounds mentioned above can be any suitable bitter compounds commonly found in natural food products. In some embodiments, the bitter compound are compounds extracted of a plant from the Meliaceae family or a plant from the Rutacaea family. In some further embodiments, the bitter compound is an extract of a plant from the Rutacaea family and the *Citrus* genus, such as an extract from the tree or fruit of orange, lemon, grapefruit, lime, kumquat, pomelo, tangelo, ugh, tangerine, or yuzu. In some embodiments, the bitter compound is a triterpene. In some further embodiments, the bitter compound is a tetranortriterpenoid. In some further embodiments, the bitter compound is a limonoid. In some such embodiments, the bitter compound is limonin, nomilin, nomilic acid, azadirachtin, or any combination thereof. In some embodiments, the bitter compound is limonin. In some embodiments, the bitter compound is nomilin. In some embodiments, the bitter compound is naringin.

In certain other embodiments, the ingestible composition comprises other bitter compounds and the HMF compounds. In some embodiments, the concentration of the HMF compound, or its comestibly acceptable salts, is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like. The bitter compounds include, but are not limited to, active pharmaceutical ingredients (APIs), tannins (such as those in coffee, tea, wine), caffeine, quinine, catechins, polyphenols, potassium chloride, menthol, or plant starches or proteins, algal proteins or starches, fungal proteins or starches, alcohol, and any combination thereof.

In certain particular embodiments, the ingestible composition comprises sodium (i.e., sodium cation, which can be replaced by potassium cation, such as potassium chloride), and the HMF compounds. In some such embodiments, the introduction of the HMF compounds permits one to use less sodium (such as more than 10% less, more than 20% less, more than 30% less, more than 40% less, more than 50% less, more than 60% less, or more than 70% less, or more than 80% less, or more than 90% less) and still achieve a taste characteristic of a comparable product that employs a higher concentration of sodium. In some related embodiments, the use of the HMF compound permits the elimination of sodium from the composition. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like. The sodium can be any suitable sodium source, such as table salt, sea salt, soy sauce, fish sauce, shrimp paste, butter, miso, and Worcestershire sauce.

In certain other embodiments, the ingestible composition comprises sour compounds and the HMF compounds. In some embodiments, the concentration of the HMF compound, or its comestibly acceptable salts, is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like. The sour compounds include, but are not limited to, organic acids, such as acetic acid, malonic acid, citric acid, and the like.

In some instances, one may be able to reduce the amount of sweetener in a product by reducing bitter taste or enhancing sweetness.

In certain particular embodiments, the ingestible composition comprises sucrose and the HMF compound. In some such embodiments, the introduction of the HMF compound permits one to use less sucrose (such as more than 10% less, more than 20% less, more than 30% less, more than 40% less, more than 50% less, more than 60% less, or more than 70% less) and still achieve a level of sweetness characteristic of a comparable product that employs more sucrose. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like. The sucrose can be introduced in any suitable form, such as natural syrups (cane syrup) and the like.

In certain particular embodiments, the ingestible composition comprises fructose and a HMF compound. In some such embodiments, the introduction of the HMF compound permits one to use less fructose (such as more than 10% less, more than 20% less, more than 30% less, more than 40% less, more than 50% less, more than 60% less, or more than 70% less) and still achieve a level of sweetness characteristic of a comparable product that employs more fructose. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. In some embodiments, the ingestible composition is a food product, such as any of those specifically listed below. In other embodiments, the ingestible composition is a beverage product, such as a soda, and the like. The fructose can be supplied in any suitable form, such as natural syrups, high-fructose corn syrup, and the like.

In certain particular embodiments, the ingestible composition comprises high-fructose corn syrup and a HMF compound. In some such embodiments, the introduction of the HMF compound permits one to use less high-fructose corn syrup (such as more than 10% less, more than 20% less, more than 30% less, more than 40% less, more than 50% less, more than 60% less, or more than 70% less) and still achieve a level of sweetness characteristic of a comparable product that employs more high-fructose corn syrup. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. In some embodiments, the ingestible composition is a food product, such as any of those specifically listed below. In other embodiments, the ingestible composition is a beverage product, such as a soda, and the like.

In certain particular embodiments, the ingestible composition comprises glucose (for example, D-glucose, in either its alpha or beta forms, or a combination thereof) and a HMF compound. In some such embodiments, the introduction of the HMF compound permits one to use less glucose (such as more than 10% less, more than 20% less, more than 30% less, more than 40% less, more than 50% less, more than 60% less, or more than 70% less) and still achieve a level of sweetness characteristic of a comparable product that employs more glucose. In some embodiments, the concentration of HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like. The glucose can be introduced in any suitable form, such as natural syrups and the like.

In certain particular embodiments, the ingestible composition comprises sucralose and a HMF compound. In some such embodiments, the introduction of the HMF compound permits one to use less sucralose (such as more than 10% less, more than 20% less, more than 30% less, more than 40% less, more than 50% less, more than 60% less, or more than 70% less) and still achieve a level of sweetness characteristic of a comparable product that employs more sucralose. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like.

In certain particular embodiments, the ingestible composition comprises rebaudiosides (such as rebaudioside A, rebaudioside D, rebaudioside E, rebaudioside M, or any combination thereof) and a HMF compound. In some such embodiments, the introduction of the HMF compound permits one to use less rebaudioside (such as more than 10% less, more than 20% less, more than 30% less, more than 40% less, more than 50% less, more than 60% less, or more than 70% less) and still achieve a level of sweetness characteristic of a comparable product that employs more rebaudioside. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like.

In certain particular embodiments, the ingestible composition comprises acefulfame K and a HMF compound. In some such embodiments, the introduction of the HMF compound permits one to use less acesulfame K (such as more than 10% less, more than 20% less, more than 30% less, more than 40% less, more than 50% less, more than 60% less, or more than 70% less) and still achieve a level of sweetness characteristic of a comparable product that employs more acesulfame K. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like.

In certain particular embodiments, the ingestible composition comprises allulose and a HMF compound. In some such embodiments, the introduction of the HMF compound permits one to use less allulose (such as more than 10% less, more than 20% less, more than 30% less, more than 40% less, more than 50% less, more than 60% less, or more than 70% less) and still achieve a level of sweetness characteristic of a comparable product that employs more allulose. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like.

In certain particular embodiments, the ingestible composition comprises erythritol and a HMF compound. In some such embodiments, the introduction of the HMF compound permits one to use less erythritol (such as more than 10% less, more than 20% less, more than 30% less, more than 40% less, more than 50% less, more than 60% less, or more than 70% less) and still achieve a level of sweetness characteristic of a comparable product that employs more erythritol. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like.

In certain particular embodiments, the ingestible composition comprises aspartame and a HMF compound. In some such embodiments, the introduction of the HMF compound permits one to use less aspartame (such as more than 10% less, more than 20% less, more than 30% less, more than 40% less, more than 50% less, more than 60% less, or more than 70% less) and still achieve a level of sweetness characteristic of a comparable product that employs more aspartame. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like.

In certain particular embodiments, the ingestible composition comprises cyclamate and a HMF compound. In some such embodiments, the introduction of the HMF compound permits one to use less cyclamate (such as more than 10% less, more than 20% less, more than 30% less, more than 40% less, more than 50% less, more than 60% less, or more than 70% less) and still achieve a level of sweetness characteristic of a comparable product that employs more cyclamate. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like.

In certain particular embodiments, the ingestible composition comprises a mogroside (such as mogroside III, mogroside IV, mogroside V, siamenoside, isomogroside V, mogroside IVE, isomogroside V, mogroside IIIE, 11-oxomogroside V, the alpha isomer of isomogroside V, and any combinations thereof) and a HMF compound. In some such embodiments, the introduction of the HMF compound permits one to use less a mogroside (such as more than 10% less, more than 20% less, more than 30% less, more than 40% less, more than 50% less, more than 60% less, or more than 70% less) and still achieve a level of sweetness characteristic of a comparable product that employs more mogroside. In some embodiments, the concentration of the HMF compound is no more than 1000 ppm, or no more than 900 ppm, or no more than 800 ppm, or no more than 700 ppm, or no more than 600 ppm, or no more than 500 ppm, or no more than 400 ppm, or no more than 300 ppm, or no more than 200 ppm, or no more than 100 ppm, or no more than 50 ppm, or no more than 25 ppm, or no more than 10 ppm. Such ingestible compositions can be in any suitable form. In some embodiments, the ingestible composition is a food product, such as any of those specifically listed below. In other embodiments, the ingestible composition is a beverage product, such as a soda, and the like. Additional mogroside compounds that may be suitably used are described in U.S. Patent Application Publication No. 2017/0119032.

Thus, in some embodiments, the compositions set forth in any of the foregoing aspects (including in any uses or methods), comprise a HMF compound and other sweeteners. In some embodiments, the composition further comprises a vehicle. In some embodiments, the vehicle is water. In some embodiments, the HMF compound is present at a concentration at or below its sweetness recognition threshold.

For example, in some embodiments, the sweetener is present in an amount from about 0.1% to about 12% by weight. In some embodiments, the sweetener is present in an amount from about 0.2% to about 10% by weight. In some embodiments, the sweetener is present in an amount from about 0.3% to about 8% by weight. In some embodiments, the sweetener is present in an amount from about 0.4% to about 6% by weight. In some embodiments, the sweetener is present in an amount from about 0.5% to about 5% by weight. In some embodiments, the sweetener is present in an amount from about 1% to about 2% by weight. In some embodiments, the sweetener is present in an amount from about 0.1% to about 5% by weight. In some embodiments, the sweetener is present in an amount from about 0.1% to about 4% by weight. In some embodiments, the sweetener is present in an amount from about 0.1% to about 3% by weight. In some embodiments, the sweetener is present in an amount from about 0.1% to about 2% by weight. In some embodiments, the sweetener is present in an amount from about 0.1% to about 1% by weight. In some embodiments, the sweetener is present in an amount from about 0.1% to about 0.5% by weight. In some embodiments, the sweetener is present in an amount from about 0.5% to about 10% by weight. In some embodiments, the sweetener is present in an amount from about 2% to about 8% by weight. In some further embodiments of the embodiments set forth in this paragraph, the sweetener is sucrose, fructose, glucose, xylitol, erythritol, or combinations thereof.

In some other embodiments, the sweetener is present in an amount from 10 ppm to 1000 ppm. In some embodiments, the sweetener is present in an amount from 20 ppm to 800 ppm. In some embodiments, the sweetener is present in an amount from 30 ppm to 600 ppm. In some embodiments, the sweetener is present in an amount from 40 ppm to 500 ppm. In some embodiments, the sweetener is present in an amount from 50 ppm to 400 ppm. In some embodiments, the sweetener is present in an amount from 50 ppm to 300 ppm. In some embodiments, the sweetener is present in an amount from 50 ppm to 200 ppm. In some embodiments, the sweetener is present in an amount from 50 ppm to 150 ppm. In some further embodiments of the embodiments set forth in this paragraph, the sweetener is a steviol glycoside, a mogroside, a derivative of either of the foregoing, such as glycoside derivatives (e.g., glucosylates), or any combination thereof.

The compositions can include any suitable sweeteners or combination of sweeteners. In some embodiments, the sweetener is a common saccharide sweeteners, such as sucrose, fructose, glucose, and sweetener compositions comprising natural sugars, such as corn syrup (including high fructose corn syrup) or other syrups or sweetener concentrates derived from natural fruit and vegetable sources. In some embodiments, the sweetener is sucrose, fructose, or a combination thereof. In some embodiments, the sweetener is sucrose. In some other embodiments, the sweetener is selected from rare natural sugars including D-allose, D-psicose, L-ribose, D-tagatose, L-glucose, L-fucose, L-arbinose, D-turanose, and D-leucrose. In some embodiments, the sweetener is selected from semi-synthetic "sugar alcohol" sweeteners such as erythritol, isomalt, lactitol, mannitol, sorbitol, xylitol, maltodextrin, and the like. In some embodiments, the sweetener is selected from artificial sweeteners such as aspartame, saccharin, acesulfame-K, cyclamate, sucralose, and alitame. In some embodiments, the sweetener is selected from the group consisting of cyclamic acid, mogroside, tagatose, maltose, galactose, mannose, sucrose, fructose, lactose, neotame and other aspartame derivatives, glucose, D-tryptophan, glycine, maltitol, lactitol, isomalt, hydrogenated glucose syrup (HGS), hydrogenated starch hydrolyzate (HSH), stevioside, rebaudioside A, other sweet Stevia-based glycosides, chemically modified steviol glycosides (such as glucosylated steviol glycosides), mogrosides, chemically modified mogrosides (such as glucosylated mogrosides), carrelame and other guanidine-based sweeteners. In some embodiments, the sweetener is a combination of two or more of the sweeteners set forth in this paragraph. In some embodiments, the sweetener may combinations of two, three, four or five sweeteners as disclosed herein. In some embodiments, the sweetener may be a sugar. In some embodiments, the sweetener may be a combination of one or more sugars and other natural and artificial sweeteners. In some embodiments, the sweetener is a sugar. In some embodiments, the sugar is cane sugar. In some embodiments, the sugar is beet sugar. In some embodiments, the sugar may be sucrose, fructose, glucose or combinations thereof. In some embodiments, the sugar may be sucrose. In some embodiments, the sugar may be a combination of fructose and glucose.

The sweetener can also include, for example, sweetener compositions comprising one or more natural or synthetic carbohydrate, such as corn syrup, high fructose corn syrup, high maltose corn syrup, glucose syrup, sucralose syrup, hydrogenated glucose syrup (HGS), hydrogenated starch hydrolyzate (HSH), or other syrups or sweetener concentrates derived from natural fruit and vegetable sources, or semi-synthetic "sugar alcohol" sweeteners such as polyols. Non-limiting examples of polyols in some embodiments include erythritol, maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, isomaltulose, maltodextrin, and the like, and sugar alcohols or any other carbohydrates or combinations thereof capable of being reduced which do not adversely affect taste.

The sweetener may be a natural or synthetic sweetener that includes, but is not limited to, agave inulin, agave nectar, agave syrup, amazake, brazzein, brown rice syrup, coconut crystals, coconut sugars, coconut syrup, date sugar, fructans (also referred to as inulin fiber, fructo-oligosaccharides, or oligo-fructose), green *Stevia* powder, *Stevia rebaudiana*, rebaudioside A, rebaudioside B, rebaudioside C, rebaudioside D, rebaudioside E, rebaudioside F, rebaudioside I, rebaudioside H, rebaudioside L, rebaudioside K, rebaudioside J, rebaudioside N, rebaudioside O, rebaudioside M and other sweet *Stevia*-based glycosides, stevioside, stevioside extracts, honey, Jerusalem artichoke syrup, licorice root, luo han guo (fruit, powder, or extracts), lucuma (fruit, powder, or extracts), maple sap (including, for example, sap extracted from *Acer saccharum, Acer nigrum, Acer rubrum, Acer saccharinum, Acer platanoides, Acer negundo, Acer macrophyllum, Acer grandidentatum, Acer*

*glabrum, Acer mono*), maple syrup, maple sugar, walnut sap (including, for example, sap extracted from *Juglans cinerea, Juglans nigra, Juglans ailatifolia, Juglans regia*), birch sap (including, for example, sap extracted from *Betula papyrifera, Betula alleghaniensis, Betula lenta, Betula nigra, Betula populifolia, Betula pendula*), sycamore sap (such as, for example, sap extracted from *Platanus occidentalis*), ironwood sap (such as, for example, sap extracted from *Ostrya virginiana*), mascobado, molasses (such as, for example, blackstrap molasses), molasses sugar, monatin, monellin, cane sugar (also referred to as natural sugar, unrefined cane sugar, or sucrose), palm sugar, panocha, piloncillo, rapadura, raw sugar, rice syrup, sorghum, sorghum syrup, cassava syrup (also referred to as tapioca syrup), thaumatin, yacon root, malt syrup, barley malt syrup, barley malt powder, beet sugar, cane sugar, crystalline juice crystals, caramel, carbitol, carob syrup, castor sugar, hydrogenated starch hydrolates, hydrolyzed can juice, hydrolyzed starch, invert sugar, anethole, arabinogalactan, arrope, syrup, P-4000, acesulfame potassium (also referred to as acesulfame K or ace-K), alitame (also referred to as aclame), advantame, aspartame, baiyunoside, neotame, benzamide derivatives, bernadame, canderel, carrelame and other guanidine-based sweeteners, vegetable fiber, corn sugar, coupling sugars, curculin, cyclamates, cyclocarioside I, demerara, dextran, dextrin, diastatic malt, dulcin, sucrol, valzin, dulcoside A, dulcoside B, emulin, enoxolone, maltodextrin, saccharin, estragole, ethyl maltol, glucin, gluconic acid, glucono-lactone, glucosamine, glucoronic acid, glycerol, glycine, glycyphillin, glycyrrhizin, glycyrrhetic acid monoglucuronide, golden sugar, yellow sugar, golden syrup, granulated sugar, gynostemma, hernandulcin, isomerized liquid sugars, jallab, chicory root dietary fiber, kynurenine derivatives (including N'-formyl-kynurenine, N'-acetyl-kynurenine, 6-chloro-kynurenine), galactitol, litesse, ligicane, lycasin, lugduname, guanidine, falernum, mabinlin I, mabinlin II, maltol, maltisorb, maltodextrin, maltotriol, mannosamine, miraculin, mizuame, mogrosides (including, for example, mogroside IV, mogroside V, and neomogroside), mukurozioside, nano sugar, naringin dihydrochalcone, neohesperidine dihydrochalcone, nib sugar, nigero-oligosaccharide, norbu, orgeat syrup, osladin, pekmez, pentadin, periandrin I, perillaldehyde, perillartine, petphyllum, phenylalanine, phlomisoside I, phlorodizin, phyllodulcin, polyglycitol syrups, polypodoside A, pterocaryoside A, pterocaryoside B, rebiana, refiners syrup, rub syrup, rubusoside, selligueain A, shugr, siamenoside I, siraitia grosvenorii, soybean oligosaccharide, Splenda, SRI oxime V, steviol glycoside, steviolbioside, stevioside, strogins 1, 2, and 4, sucronic acid, sucrononate, sugar, suosan, phloridzin, superaspartame, tetrasaccharide, threitol, treacle, trilobtain, tryptophan and derivatives (6-trifluoromethyl-tryptophan, 6-chloro-D-tryptophan), vanilla sugar, volemitol, birch syrup, aspartame-acesulfame, assugrin, and combinations or blends of any two or more thereof.

In still other embodiments, the sweetener can be a chemically or enzymatically modified natural high potency sweetener. Modified natural high potency sweeteners include glycosylated natural high potency sweetener such as glucosyl-, galactosyl-, or fructosyl-derivatives containing 1-50 glycosidic residues. Glycosylated natural high potency sweeteners may be prepared by enzymatic transglycosylation reaction catalyzed by various enzymes possessing transglycosylating activity. In some embodiments, the modified sweetener can be substituted or unsubstituted.

Additional sweeteners also include combinations of any two or more of any of the aforementioned sweeteners. In some embodiments, the sweetener may comprise combinations of two, three, four or five sweeteners as disclosed herein. In some embodiments, the sweetener may be a sugar. In some embodiments, the sweetener may be a combination of one or more sugars and other natural and artificial sweeteners. In some embodiments, the sweetener is a caloric sweetener, such as sucrose, fructose, xylitol, erythritol, or combinations thereof. In some embodiments, the ingestible compositions are free (or, in some embodiments) substantially free of *Stevia*-derived sweeteners, such as steviol glycosides, glucosylated steviol glycosides, or rebaudiosides. For example, in some embodiments, the ingestible compositions are either free of *Stevia*-derived sweeteners or comprise *Stevia*-derived sweeteners in a concentration of no more than 1000 ppm, or no more than 500 ppm, or no more than 200 ppm, or no more than 100 ppm, or no more than 50 ppm, or no more than 20 ppm, or no more than 10 ppm, or no more than 5 ppm, or no more than 3 ppm, or no more than 1 ppm.

The HMF compounds can be present in the ingestible compositions in any suitable amount. In some embodiments, the HMF compounds are present in an amount sufficient to enhance the taste (e.g., enhance the sweetness, reduce the sourness, reduce the bitterness, or reduce the astringency) of the compositions. Thus, in some embodiments, the ingestible composition comprises the HMF compound in a concentration no greater than 200 ppm, or no greater than 150 ppm, or no greater than 100 ppm, or no greater than 50 ppm, or no greater than 40 ppm, or no greater than 30 ppm, or no greater than 20 ppm. In some embodiments, the HMF compound is present in a minimum amount, such as 1 ppm or 5 ppm. Thus, in some embodiments, the ingestible composition comprises the HMF compound in a concentration ranging from 1 ppm to 200 ppm, or from 1 ppm to 150 ppm, or from 1 ppm to 100 ppm, or from 1 ppm to 50 ppm, or from 1 ppm to 40 ppm, or from 1 ppm to 30 ppm, or from 1 ppm to 20 ppm, or from 5 ppm to 200 ppm, or from 5 ppm to 150 ppm, or from 5 ppm to 100 ppm, or from 5 ppm to 50 ppm, or from 5 ppm to 40 ppm, or from 5 ppm to 30 ppm, or from 5 ppm to 20 ppm. In embodiments where a sweetener, such as sucrose or fructose, are present, the weight-to-weight ratio of sweetener to the HMF compound in the ingestible composition ranges from 1000:1 to 50000:1, or from 1000:1 to 10000:1, or from 2000:1 to 8000:1.

The ingestible compositions or sweetener concentrates can, in certain embodiments, comprise any additional ingredients or combination of ingredients as are commonly used in food and beverage products, including, but not limited to:

- acids, including, for example citric acid, phosphoric acid, ascorbic acid, sodium acid sulfate, lactic acid, or tartaric acid;
- bitter ingredients, including, for example caffeine, quinine, green tea, catechins, polyphenols, green robusta coffee extract, green coffee extract, potassium chloride, menthol, or proteins (such as proteins and protein isolates derived from plants, algae, or fungi);
- coloring agents, including, for example caramel color, Red #40, Yellow #5, Yellow #6, Blue #1, Red #3, purple carrot, black carrot juice, purple sweet potato, vegetable juice, fruit juice, beta carotene, turmeric curcumin, or titanium dioxide;
- preservatives, including, for example sodium benzoate, potassium benzoate, potassium sorbate, sodium metabisulfate, sorbic acid, or benzoic acid;
- antioxidants including, for example ascorbic acid, calcium disodium EDTA, alpha tocopherols, mixed tocopherols, rosemary extract, grape seed extract, resveratrol, or sodium hexametaphosphate;

vitamins or functional ingredients including, for example resveratrol, Co-Q10, omega 3 fatty acids, theanine, choline chloride (citocoline), fibersol, inulin (chicory root), taurine, panax ginseng extract, guanana extract, ginger extract, L-phenylalanine, L-carnitine, L-tartrate, D-glucoronolactone, inositol, bioflavonoids, Echinacea, *Gingko biloba, Yerba mate*, flax seed oil, garcinia cambogia rind extract, white tea extract, ribose, milk thistle extract, grape seed extract, pyrodixine HCl (vitamin B6), cyanoobalamin (vitamin B12), niacinamide (vitamin B3), biotin, calcium lactate, calcium pantothenate (pantothenic acid), calcium phosphate, calcium carbonate, chromium chloride, chromium polynicotinate, cupric sulfate, folic acid, ferric pyrophosphate, iron, magnesium lactate, magnesium carbonate, magnesium sulfate, monopotassium phosphate, monosodium phosphate, phosphorus, potassium iodide, potassium phosphate, riboflavin, sodium sulfate, sodium gluconate, sodium polyphosphate, sodium bicarbonate, thiamine mononitrate, vitamin D3, vitamin A palmitate, zinc gluconate, zinc lactate, or zinc sulphate;

clouding agents, including, for example ester gun, brominated vegetable oil (BVO), or sucrose acetate isobutyrate (SAIB);

buffers, including, for example sodium citrate, potassium citrate, or salt;

flavors, including, for example propylene glycol, ethyl alcohol, glycerine, gum Arabic (gum acacia), maltodextrin, modified corn starch, dextrose, natural flavor, natural flavor with other natural flavors (natural flavor WONF), natural and artificial flavors, artificial flavor, silicon dioxide, magnesium carbonate, or tricalcium phosphate; or starches and stabilizers, including, for example pectin, xanthan gum, carboxylmethylcellulose (CMC), polysorbate 60, polysorbate 80, medium chain triglycerides, cellulose gel, cellulose gum, sodium caseinate, modified food starch, gum Arabic (gum acacia), inulin, or carrageenan.

The ingestible compositions or sweetener concentrates can have any suitable pH. In some embodiments, the HMF compounds enhance the sweetness of a sweetener under a broad range of pH, e.g., from lower pH to neutral pH. The lower and neutral pH includes, but is not limited to, a pH from about 2.5 to about 8.5; from about 3.0 to about 8.0; from about 3.5 to about 7.5; and from about 4.0 to about 7. In certain embodiments, compounds as disclosed and described herein, individually or in combination, can enhance the perceived sweetness of a fixed concentration of a sweetener in taste tests at a compound concentration of about 50 μM, 40 μM, 30 μM, 20 μM, or 10 μM at both low to neutral pH value. In certain embodiments, the enhancement factor of the compounds as disclosed and described herein, individually or in combination, at the lower pH is substantially similar to the enhancement factor of the compounds at neutral pH. Such consistent sweet enhancing property under a broad range of pH allow a broad use in a wide variety of foods and beverages of the compounds as disclosed and described herein, individually or in combination.

The ingestible compositions set forth according to any of the foregoing embodiments, also include, in certain embodiments, one or more additional HMF compounds, such as compounds that enhance sweetness (e.g., hesperetin, neohesperitin, phloretin, naringenin, glucosylated steviol glycosides, etc.), compounds that block bitterness, compounds that enhance umami, compounds that reduce sourness or licorice taste, compounds that enhance saltiness, compounds that enhance a cooling effect, or any combinations of the foregoing.

The ingestible compositions set forth according to any of the foregoing embodiments, also include, in certain embodiments, one or more additional HMF compounds, such as compounds that enhance sweetness (e.g., hesperetin, hesperitin dihydrochalcone, hesperitin dihydrochalcone glucoside, 3-hydroxybenzoic acid, phloretin, naringenin, rhoifolin, glucosylated steviol glycosides, (2R,3R)-3-acetoxy-5,7,4'-trihydroxyflavanone, (2R,3R)-3-acetoxy-5,7,3'-trihydroxy-4'-methoxyflavanone, and the like), compounds that block bitterness, compounds that enhance umami, compounds that reduce sourness or licorice taste, compounds that enhance saltiness, compounds that enhance a cooling effect, or any combinations of the foregoing.

Thus, in some embodiments, ingestible compositions disclosed herein comprise a HMF compound according to any of the embodiments or combination of embodiments set forth above, are combined with one or more other sweetness enhancing compounds. Such sweetness enhancing compounds include, but are not limited to, naturally derived compounds, such as hesperetin, hesperitin dihydrochalcone, hesperitin dihydrochalcone glucoside, 3-hydroxybenzoic acid, phloretin, naringenin, rhoifolin, glucosylated steviol glycosides, (2R,3R)-3-acetoxy-5,7,4'-trihydroxyflavanone, (2R,3R)-3-acetoxy-5,7,3'-trihydroxy-4'-methoxyflavanone, or synthetic compounds, such as any compounds set forth in U.S. Pat. Nos. 8,541,421; 8,815,956; 9,834,544; 8,592,592; 8,877,922; 9,000,054; and 9,000,051, as well as U.S. Patent Application Publication No. 2017/0119032. The HMF compound may be used in combination with such other sweetness enhancers in any suitable ratio (w/w) ranging from 1:1000 to 1000:1, or from 1:100 to 100:1, or from, 1:50 to 50:1, or from 1:25 to 25:1, or from 1:10 to 10:1, such as 1:25, 1:24, 1:23, 1:22, 1:21, 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, or 25:1. In some embodiments of any of the preceding embodiments, the HMF compound is combined with glucosylated steviol glycosides in any of the above ratios. As used herein, the term "glucosylated steviol glycoside" refers to the product of enzymatically glucosylating natural steviol glycoside compounds. The glucosylation generally occurs through a glycosidic bond, such as an α-1,2 bond, an α-1,4 bond, an α-1.6 bond, a β-1,2 bond, a β-1,4 bond, a β-1,6 bond, and so forth. In some embodiments of any of the preceding embodiments, the TM1 compound (or any comestibly acceptable salts thereof) is combined with N-(1-((4-amino-2,2-dioxo-1H-benzo[c][1,2,6]thiadiazin-5-yl)oxy)-2-methyl-propan-2-yl)isonicotinamide, in any of the above ratios.

In some further embodiments, ingestible compositions disclosed herein comprise a HMF compound according to any of the embodiments or combination of embodiments set forth above, are combined with one or more umami enhancing compounds. Such umami enhancing compounds include, but are not limited to, naturally derived compounds, such as ericamide, or synthetic compounds, such as any compounds set forth in U.S. Pat. Nos. 8,735,081; 8,124,121; and 8,968,708. The HMF compound may be used in combination with such umami enhancers in any suitable ratio (w/w) ranging from 1:1000 to 1000:1, or from 1:100 to 100:1, or from, 1:50 to 50:1, or from 1:25 to 25:1, or from 1:10 to 10:1, such as 1:25, 1:24, 1:23, 1:22, 1:21, 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, or 25:1.

In some further embodiments, ingestible compositions disclosed herein comprise a HMF compound according to any of the embodiments or combination of embodiments set forth above, are combined with one or more cooling enhancing compounds. Such cooling enhancing compounds include, but are not limited to, naturally derived compounds, such as menthol or analogs thereof, or synthetic compounds, such as any compounds set forth in U.S. Pat. Nos. 9,394,287 and 10,421,727. The HMF compound may be used in combination with such umami enhancers in any suitable ratio (w/w) ranging from 1:1000 to 1000:1, or from 1:100 to 100:1, or from, 1:50 to 50:1, or from 1:25 to 25:1, or from 1:10 to 10:1, such as 1:25, 1:24, 1:23, 1:22, 1:21, 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, or 25:1.

In some further embodiments, ingestible compositions disclosed herein comprise a HMF compound according to any of the embodiments or combination of embodiments set forth above, are combined with one or more bitterness blocking compounds. Such bitterness blocking compounds include, but are not limited to, naturally derived compounds, such as menthol or analogs thereof, or synthetic compounds, such as any compounds set forth in U.S. Pat. Nos. 8,076,491; 8,445,692; and 9,247,759. The HMF compound may be used in combination with such bitterness blockers in any suitable ratio (w/w) ranging from 1:1000 to 1000:1, or from 1:100 to 100:1, or from, 1:50 to 50:1, or from 1:25 to 25:1, or from 1:10 to 10:1, such as 1:25, 1:24, 1:23, 1:22, 1:21, 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, or 25:1.

In some further embodiments, ingestible compositions disclosed herein comprise a HMF compound according to any of the embodiments or combination of embodiments set forth above, are combined with one or more sour taste modulating compounds. The HMF compound may be used in combination with such sour taste modulating compounds in any suitable ratio (w/w) ranging from 1:1000 to 1000:1, or from 1:100 to 100:1, or from, 1:50 to 50:1, or from 1:25 to 25:1, or from 1:10 to 10:1, such as 1:25, 1:24, 1:23, 1:22, 1:21, 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, or 25:1.

In some further embodiments, ingestible compositions disclosed herein comprise a HMF compound according to any of the embodiments or combination of embodiments set forth above, are combined with one or more mouthfeel modifying compounds. Such mouthfeel modifying compounds include, but are not limited to, tannins, cellulosic materials, bamboo powder, and the like. The HMF compound may be used in combination with such mouthfeel enhancers in any suitable ratio (w/w) ranging from 1:1000 to 1000:1, or from 1:100 to 100:1, or fro, 1:50 to 50:1, or from 1:25 to 25:1, or from 1:10 to 10:1, such as 1:25, 1:24, 1:23, 1:22, 1:21, 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, or 25:1.

In some further embodiments, ingestible compositions disclosed herein comprise a HMF compound according to any of the embodiments or combination of embodiments set forth above, are combined with one or more flavor masking compounds. Such flavor masking compounds include, but are not limited to, cellulosic materials, materials extracted from fungus, materials extracted from plants, citric acid, carbonic acid (or carbonates), and the like. The HMF compound may be used in combination with such mouthfeel enhancers in any suitable ratio (w/w) ranging from 1:1000 to 1000:1, or from 1:100 to 100:1, or from, 1:50 to 50:1, or from 1:25 to 25:1, or from 1:10 to 10:1, such as 1:25, 1:24, 1:23, 1:22, 1:21, 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, or 25:1.

In some aspects related to the preceding aspects and embodiments, the disclosure provides uses of the HMF compound to enhance the flavor of a flavored composition, such as a flavored article. Such flavored compositions can use any suitable flavors, such as any of the flavors set forth above.

Flavored Products and Concentrates

In certain aspects, the disclosure provides flavored products comprising any ingestible compositions of the preceding aspects. In some embodiments, the flavored products are beverage products, such as soda, flavored water, tea, and the like. In some other embodiments, the flavored products are food products, such as yogurt.

In embodiments where the flavored product is a beverage, the beverage may be selected from the group consisting of enhanced sparkling beverages, colas, lemon-lime flavored sparkling beverages, orange flavored sparkling beverages, grape flavored sparkling beverages, strawberry flavored sparkling beverages, pineapple flavored sparkling beverages, ginger-ales, root beers, fruit juices, fruit-flavored juices, juice drinks, nectars, vegetable juices, vegetable-flavored juices, sports drinks, energy drinks, enhanced water drinks, enhanced water with vitamins, near water drinks, coconut waters, tea type drinks, coffees, cocoa drinks, beverages containing milk components, beverages containing cereal extracts and smoothies. In some embodiments, the beverage may be a soft drink.

In certain embodiments of any aspects and embodiments set forth herein that refer to an flavored product, the flavored product is a non-naturally-occurring product, such as a packaged food or beverage product.

Further non-limiting examples of food and beverage products or formulations include sweet coatings, frostings, or glazes for such products or any entity included in the Soup category, the Dried Processed Food category, the Beverage category, the Ready Meal category, the Canned or Preserved Food category, the Frozen Processed Food category, the Chilled Processed Food category, the Snack Food category, the Baked Goods category, the Confectionery category, the Dairy Product category, the Ice Cream category, the Meal Replacement category, the Pasta and Noodle category, and the Sauces, Dressings, Condiments category, the Baby Food category, and/or the Spreads category.

In general, the Soup category refers to canned/preserved, dehydrated, instant, chilled, UHT and frozen soup. For the purpose of this definition soup(s) means a food prepared from meat, poultry, fish, vegetables, grains, fruit and other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage). Soup may be used as an ingredient for preparing other meal components and may range from broths (consommé) to sauces (cream or cheese-based soups).

The Dehydrated and Culinary Food Category usually means: (i) Cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology); (ii) Meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes; and (iii) Meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen.

The Beverage category usually means beverages, beverage mixes and concentrates, including but not limited to, carbonated and non-carbonated beverages, alcoholic and non-alcoholic beverages, ready to drink beverages, liquid concentrate formulations for preparing beverages such as sodas, and dry powdered beverage precursor mixes. The Beverage category also includes the alcoholic drinks, the soft drinks, sports drinks, isotonic beverages, and hot drinks. The alcoholic drinks include, but are not limited to beer, cider/perry, FABs, wine, and spirits. The soft drinks include, but are not limited to carbonates, such as colas and non-cola carbonates; fruit juice, such as juice, nectars, juice drinks and fruit flavored drinks; bottled water, which includes sparkling water, spring water and purified/table water; functional drinks, which can be carbonated or still and include sport, energy or elixir drinks; concentrates, such as liquid and powder concentrates in ready to drink measure. The drinks, either hot or cold, include, but are not limited to coffee or ice coffee, such as fresh, instant, and combined coffee; tea or ice tea, such as black, green, white, oolong, and flavored tea; and other drinks including flavor-, malt- or plant-based powders, granules, blocks or tablets mixed with milk or water.

The Snack Food category generally refers to any food that can be a light informal meal including, but not limited to Sweet and savory snacks and snack bars. Examples of snack food include, but are not limited to fruit snacks, chips/crisps, extruded snacks, tortilla/corn chips, popcorn, pretzels, nuts and other sweet and savory snacks. Examples of snack bars include, but are not limited to granola/muesli bars, breakfast bars, energy bars, fruit bars and other snack bars.

The Baked Goods category generally refers to any edible product the process of preparing which involves exposure to heat or excessive sunlight. Examples of baked goods include, but are not limited to bread, buns, cookies, muffins, cereal, toaster pastries, pastries, waffles, tortillas, biscuits, pies, bagels, tarts, quiches, cake, any baked foods, and any combination thereof.

The Ice Cream category generally refers to frozen dessert containing cream and sugar and flavoring. Examples of ice cream include, but are not limited to: impulse ice cream; take-home ice cream; frozen yoghurt and artisanal ice cream; soy, oat, bean (e.g., red bean and mung bean), and rice-based ice creams.

The Confectionery category generally refers to edible product that is sweet to the taste. Examples of confectionery include, but are not limited to candies, gelatins, chocolate confectionery, sugar confectionery, gum, and the likes and any combination products.

The Meal Replacement category generally refers to any food intended to replace the normal meals, particularly for people having health or fitness concerns. Examples of meal replacement include, but are not limited to slimming products and convalescence products.

The Ready Meal category generally refers to any food that can be served as meal without extensive preparation or processing. The ready meal includes products that have had recipe "skills" added to them by the manufacturer, resulting in a high degree of readiness, completion and convenience. Examples of ready meal include, but are not limited to canned/preserved, frozen, dried, chilled ready meals; dinner mixes; frozen pizza; chilled pizza; and prepared salads.

The Pasta and Noodle category includes any pastas and/or noodles including, but not limited to canned, dried and chilled/fresh pasta; and plain, instant, chilled, frozen and snack noodles.

The Canned/Preserved Food category includes, but is not limited to canned/preserved meat and meat products, fish/seafood, vegetables, tomatoes, beans, fruit, ready meals, soup, pasta, and other canned/preserved foods.

The Frozen Processed Food category includes, but is not limited to frozen processed red meat, processed poultry, processed fish/seafood, processed vegetables, meat substitutes, processed potatoes, bakery products, desserts, ready meals, pizza, soup, noodles, and other frozen food.

The Dried Processed Food category includes, but is not limited to rice, dessert mixes, dried ready meals, dehydrated soup, instant soup, dried pasta, plain noodles, and instant noodles. The Chill Processed Food category includes, but is not limited to chilled processed meats, processed fish/seafood products, lunch kits, fresh cut fruits, ready meals, pizza, prepared salads, soup, fresh pasta and noodles.

The Sauces, Dressings and Condiments category includes, but is not limited to tomato pastes and purees, bouillon/stock cubes, herbs and spices, monosodium glutamate (MSG), table sauces, soy based sauces, pasta sauces, wet/cooking sauces, dry sauces/powder mixes, ketchup, mayonnaise, mustard, salad dressings, vinaigrettes, dips, pickled products, and other sauces, dressings and condiments.

The Baby Food category includes, but is not limited to milk- or soybean-based formula; and prepared, dried and other baby food.

The Spreads category includes, but is not limited to jams and preserves, honey, chocolate spreads, nut based spreads, and yeast based spreads.

The Dairy Product category generally refers to edible product produced from mammal's milk. Examples of dairy product include, but are not limited to drinking milk products, cheese, yoghurt and sour milk drinks, and other dairy products.

Additional examples for flavored products, particularly food and beverage products or formulations, are provided as follows. Exemplary ingestible compositions include one or more confectioneries, chocolate confectionery, tablets, countlines, bagged selflines/softlines, boxed assortments, standard boxed assortments, twist wrapped miniatures, seasonal chocolate, chocolate with toys, alfajores, other chocolate confectionery, mints, standard mints, power mints, boiled sweets, pastilles, gums, jellies and chews, toffees, caramels and nougat, medicated confectionery, lollipops, liquorice, other sugar confectionery, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savory biscuits and crackers, bread substitutes, breakfast cereals, rte cereals, family breakfast cereals, flakes, muesli, other cereals, children's breakfast cereals, hot cereals, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavored, functional and other condensed milk, flavored milk drinks, dairy only flavored milk drinks, flavored milk drinks with fruit juice, soy milk, sour milk drinks, fermented dairy drinks, coffee whiteners, powder milk, flavored powder milk drinks, cream, cheese, processed cheese, spreadable processed cheese, unspreadable processed cheese, unprocessed cheese, spreadable unprocessed cheese, hard cheese, packaged hard cheese, unpackaged hard cheese, yoghurt, plain/natural yoghurt, flavored yoghurt, fruited yoghurt, probiotic yoghurt, drinking yoghurt, regular drinking yoghurt, probiotic drinking yoghurt, chilled and shelf-stable desserts, dairy-based desserts, soy-based desserts, chilled snacks, fromage frais and quark, plain fromage frais and quark, flavored fromage frais and quark, savory fromage frais and quark, sweet and savory snacks, fruit snacks, chips/crisps, extruded snacks, tortilla/corn chips, popcorn, pretzels, nuts, other sweet and savory snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, frozen pizza, chilled pizza, soup, canned soup, dehydrated soup, instant soup, chilled soup, hot soup, frozen soup, pasta, canned pasta, dried pasta, chilled/fresh pasta, noodles, plain noodles, instant noodles, cups/bowl instant noodles, pouch instant noodles, chilled noodles, snack noodles, canned food, canned meat and meat products, canned fish/seafood, canned vegetables, canned tomatoes, canned beans, canned fruit, canned ready meals, canned soup, canned pasta, other canned foods, frozen food, frozen processed red meat, frozen processed poultry, frozen processed fish/seafood, frozen processed vegetables, frozen meat substitutes, frozen potatoes, oven baked potato chips, other oven baked potato products, non-oven frozen potatoes, frozen bakery products, frozen desserts, frozen ready meals, frozen pizza, frozen soup, frozen noodles, other frozen food, dried food, dessert mixes, dried ready meals, dehydrated soup, instant soup, dried pasta, plain noodles, instant noodles, cups/bowl instant noodles, pouch instant noodles, chilled food, chilled processed meats, chilled fish/seafood products, chilled processed fish, chilled coated fish, chilled smoked fish, chilled lunch kit, chilled ready meals, chilled pizza, chilled soup, chilled/fresh pasta, chilled noodles, oils and fats, olive oil, vegetable and seed oil, cooking fats, butter, margarine, spreadable oils and fats, functional spreadable oils and fats, sauces, dressings and condiments, tomato pastes and purees, bouillon/stock cubes, stock cubes, gravy granules, liquid stocks and fonds, herbs and spices, fermented sauces, soy based sauces, pasta sauces, wet sauces, dry sauces/powder mixes, ketchup, mayonnaise, regular mayonnaise, mustard, salad dressings, regular salad dressings, low fat salad dressings, vinaigrettes, dips, pickled products, other sauces, dressings and condiments, baby food, milk formula, standard milk formula, follow-on milk formula, toddler milk formula, hypoallergenic milk formula, prepared baby food, dried baby food, other baby food, spreads, jams and preserves, honey, chocolate spreads, nut-based spreads, and yeast-based spreads. Exemplary ingestible compositions also include confectioneries, bakery products, ice creams, dairy products, sweet and savory snacks, snack bars, meal replacement products, ready meals, soups, pastas, noodles, canned foods, frozen foods, dried foods, chilled foods, oils and fats, baby foods, or spreads or a mixture thereof. Exemplary ingestible compositions also include breakfast cereals, sweet beverages or solid or liquid concentrate compositions for preparing beverages, ideally so as to enable the reduction in concentration of previously known saccharide sweeteners, or artificial sweeteners.

Some embodiments provide a chewable composition that may or may not be intended to be swallowed. In some embodiments, the chewable composition may be gum, chewing gum, sugarized gum, sugar-free gum, functional gum, bubble gum including compounds as disclosed and described herein, individually or in combination.

Typically at least a sweet receptor modulating amount, a sweet receptor ligand modulating amount, a sweet flavor modulating amount, a sweet flavoring agent amount, a sweet flavor enhancing amount, or a therapeutically effective amount of one or more of the present compounds will be added to the ingestible composition, optionally in the presence of sweeteners so that the sweet flavor modified ingestible composition has an increased sweet taste as compared to the ingestible composition prepared without the compounds of the present invention, as judged by human beings or animals in general, or in the case of formulations testing, as judged by a majority of a panel of at least eight human taste testers, via procedures commonly known in the field.

In some embodiments, the HMF compounds as disclosed and described herein, individually or in combination, modulate the sweet taste or other taste properties of other natural or synthetic sweet tastants, and ingestible compositions made therefrom. In one embodiment, the compounds as disclosed and described herein, individually or in combination, may be used or provided in its ligand enhancing concentration(s). For example, the compounds as disclosed and described herein, individually or in combination, may be present in an amount of from 0.001 ppm to 100 ppm, or narrower alternative ranges from 0.1 ppm to 50 ppm, from 0.01 ppm to 40 ppm, from 0.05 ppm to 30 ppm, from 0.01 ppm to 25 ppm, or from 0.1 ppm to 30 ppm, or from 0.1 ppm to 25 ppm, or from 1 ppm to 30 ppm, or from 1 ppm to 25 ppm.

In some embodiments, the HMF compounds disclosed and described herein, individually or in combination, may be provided in a flavoring concentrate formulation, e.g., suitable for subsequent processing to produce a ready-to-use (i.e., ready-to-serve) product. By "a flavoring concentrate formulation", it is meant a formulation which should be reconstituted with one or more diluting medium to become a ready-to-use composition. The term "ready-to-use composition" is used herein interchangeably with "ingestible composition", which denotes any substance that, either alone or together with another substance, can be taken by mouth whether intended for consumption or not. In one embodiment, the ready-to-use composition includes a composition that can be directly consumed by a human or animal. The flavoring concentrate formulation is typically used by mixing with or diluted by one or more diluting medium, e.g., any consumable or ingestible ingredient or product, to impart or modify one or more flavors to the diluting medium. Such a use process is often referred to as reconstitution. The reconstitution can be conducted in a household setting or an industrial setting. For example, a frozen fruit juice concentrate can be reconstituted with water or other aqueous medium by a consumer in a kitchen to obtain the ready-to-use fruit juice beverage. In another example, a soft drink syrup concentrate can be reconstituted with water or other aqueous medium by a manufacturer in large industrial scales to produce the ready-to-use soft drinks. Since the flavoring concentrate formulation has the flavoring agent or flavor modifying agent in a concentration higher than the ready-to-use composition, the flavoring concentrate formulation is typically not suitable for being consumed directly without reconstitution. There are many benefits of using and producing a flavoring concentrate formulation. For example, one benefit is the reduction in weight and volume for transportation as the flavoring concentrate formulation can be reconstituted at the time of usage by the addition of suitable solvent, solid or liquid.

The flavored products set forth according to any of the foregoing embodiments, also include, in certain embodiments, one or more additional flavor-modifying compounds, such as compounds that enhance sweetness, compounds that block bitterness, compounds that enhance umami, compounds that reduce sourness, compounds that enhance saltiness, compounds that enhance a cooling effect, or any combinations of the foregoing.

In certain embodiments of any aspects and embodiments set forth herein that refer to a sweetening or flavoring concentrate, the sweetening or flavoring concentrate is a non-naturally-occurring product, such as a composition specifically manufactured for the production of a flavored product, such as food or beverage product.

In one embodiment, the flavoring concentrate formulation comprises i) compounds as disclosed and described herein, individually or in combination; ii) a carrier; and iii) optionally at least one adjuvant. The term "carrier" denotes a usually inactive accessory substance, such as solvents, binders, or other inert medium, which is used in combination with the present compound and one or more optional adjuvants to form the formulation. For example, water or starch can be a carrier for a flavoring concentrate formulation. In some embodiments, the carrier is the same as the diluting medium for reconstituting the flavoring concentrate formulation; and in other embodiments, the carrier is different from the diluting medium. The term "carrier" as used herein includes, but is not limited to, ingestibly acceptable carrier.

The term "adjuvant" denotes an additive which supplements, stabilizes, maintains, or enhances the intended function or effectiveness of the active ingredient, such as the compound of the present invention. In one embodiment, the at least one adjuvant comprises one or more flavoring agents. The flavoring agent may be of any flavor known to one skilled in the art or consumers, such as the flavor of chocolate, coffee, tea, mocha, French vanilla, peanut butter, chai, or combinations thereof. In another embodiment, the at least one adjuvant comprises one or more sweeteners. The one or more sweeteners can be any of the sweeteners described in this application. In another embodiment, the at least one adjuvant comprises one or more ingredients selected from the group consisting of a emulsifier, a stabilizer, an antimicrobial preservative, an antioxidant, vitamins, minerals, fats, starches, protein concentrates and isolates, salts, and combinations thereof. Examples of emulsifiers, stabilizers, antimicrobial preservatives, antioxidants, vitamins, minerals, fats, starches, protein concentrates and isolates, and salts are described in U.S. Pat. No. 6,468,576, the content of which is hereby incorporated by reference in its entirety for all purposes.

In one embodiment, the present flavoring concentrate formulation can be in a form selected from the group consisting of liquid including solution and suspension, solid, foamy material, paste, gel, cream, and a combination thereof, such as a liquid containing certain amount of solid contents. In one embodiment, the flavoring concentrate formulation is in form of a liquid including aqueous-based and nonaqueous-based. In some embodiments, the present flavoring concentrate formulation can be carbonated or non-carbonated.

The flavoring concentrate formulation may further comprise a freezing point depressant, nucleating agent, or both as the at least one adjuvant. The freezing point depressant is an ingestibly acceptable compound or agent which can depress the freezing point of a liquid or solvent to which the compound or agent is added. That is, a liquid or solution containing the freezing point depressant has a lower freezing point than the liquid or solvent without the freezing point depressant. In addition to depress the onset freezing point, the freezing point depressant may also lower the water activity of the flavoring concentrate formulation. The examples of the freezing point depressant include, but are not limited to, carbohydrates, oils, ethyl alcohol, polyol, e.g., glycerol, and combinations thereof. The nucleating agent denotes an ingestibly acceptable compound or agent which is able to facilitate nucleation. The presence of nucleating agent in the flavoring concentrate formulation can improve the mouthfeel of the frozen Blushes of a frozen slush and to help maintain the physical properties and performance of the slush at freezing temperatures by increasing the number of desirable ice crystallization centers. Examples of nucleating agents include, but are not limited to, calcium silicate, calcium carbonate, titanium dioxide, and combinations thereof.

In one embodiment, the flavoring concentrate formulation is formulated to have a low water activity for extended shelf life. Water activity is the ratio of the vapor pressure of water in a formulation to the vapor pressure of pure water at the same temperature. In one embodiment, the flavoring concentrate formulation has a water activity of less than about 0.85. In another embodiment, the flavoring concentrate formulation has a water activity of less than about 0.80. In another embodiment, the flavoring concentrate formulation has a water activity of less than about 0.75.

In one embodiment, the flavoring concentrate formulation has the present compound in a concentration that is at least 2 times of the concentration of the compound in a ready-to-use composition. In one embodiment, the flavoring concentrate formulation has the present compound in a concentration that is at least 5 times of the concentration of the compound in a ready-to-use composition. In one embodiment, the flavoring concentrate formulation has the present compound in a concentration that is at least 10 times of the concentration of the compound in a ready-to-use composition. In one embodiment, the flavoring concentrate formulation has the present compound in a concentration that is at least 15 times of the concentration of the compound in a ready-to-use composition. In one embodiment, the flavoring concentrate formulation has the present compound in a concentration that is at least 20 times of the concentration of the compound in a ready-to-use composition. In one embodiment, the flavoring concentrate formulation has the present compound in a concentration that is at least 30 times of the concentration of the compound in a ready-to-use composition. In one embodiment, the flavoring concentrate formulation has the present compound in a concentration that is at least 40 times of the concentration of the compound in a ready-to-use composition. In one embodiment, the flavoring concentrate formulation has the present compound in a concentration that is at least 50 times of the concentration of the compound in a ready-to-use composition. In one embodiment, the flavoring concentrate formulation has the present compound in a concentration that is at least 60 times of the concentration of the compound in a ready-to-use composition. In one embodiment, the flavoring concentrate formulation has the present compound in a concentration that is up to 100 times of the concentration of the compound in a ready-to-use composition.

The sweetening or flavoring concentrates set forth according to any of the foregoing embodiments, also include, in certain embodiments, one or more additional flavor-modifying compounds, such as compounds that enhance sweetness (e.g., hesperetin, naringenin, glucosylated steviol glycosides, etc.), compounds that block bitterness (e.g., eriodictyol, homoeriodictyol, sterubin, and salts or glycoside derivatives thereof, as well as vanillyl lignans, e.g., matairesinol and other compounds set forth in PCT Publication No. WO 2012/146584), compounds that enhance umami (e.g., rubemamine, rubescenamine, (E)-3-(3,4-dimethoxyphenyl)-N-(4-methoxyphenethyl)acrylamide, and the like), compounds that reduce sourness and/or licorice taste, compounds that enhance saltiness, compounds that enhance a cooling effect, or any combinations of the foregoing.

Treatment of Compositions of Diseased *Citrus*

In one or more aspects, the disclosure provides methods for reducing the bitterness of *citrus* compositions derived from *citrus* fruit having *citrus* greening disease, the method comprising: (a) deriving a *citrus* composition from *citrus* fruit, wherein at least a portion of the *citrus* fruit has *citrus* greening disease; and (b) introducing to the *citrus* composition a bitterness-reducing composition, which comprises HMF compounds, such as an amount (such as a bitterness-reducing effective amount) of HMF compounds.

In some embodiments, the *citrus* composition comprises an abnormally elevated concentration of one or more bitter compounds, such as abnormally elevated levels of limonin or nomilin. In some embodiments, the bitter compounds are limonoids, such as limonin, nomilin, nomilinic acid, or any combination thereof.

Any suitable HMF compounds can be used. In some embodiments, the HMF compounds are compounds of formula (I), or comestibly acceptable salts thereof, as set forth above. In some embodiments, the HMF compounds are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. In some embodiments, the bitterness-reducing composition comprising the PMFs is derived from *citrus* waste. The HMF compounds may be present in any of the concentrations set forth above for ingestible compositions.

Blocking Bitterness in Pharmaceutical APIs

Many drug compounds impart a bitter taste, which therefore limits the ways in which they can be formulated and administered. Therefore, in certain aspects, the disclosure provides a pharmaceutical composition comprising a bitter-tasting pharmaceutical active ingredient and one or more HMF compounds, such as those set forth herein. In some embodiments, the one or more PMFs are selected from the group consisting of: 4'-hydroxy-5,6,7,3'-tetramethoxyflavone; 4'-hydroxy-3,5,6,7,3'-pentamethoxyflavone; 4'-hydroxy-5,6,7,8,3'-pentamethoxyflavone; 4'-hydroxy-5,6,7,-trimethoxyflavone; 4'-hydroxy-3,5,6,7,8,3'-hexamethoxyflavone; 4'-hydroxy-5,6,7,8-tetramethoxyflavone; 3'-hydroxy-5,6,7,4'-tetramethoxyflavone; 3'-hydroxy-3,5,6,7,4'-pentamethoxyflavone; 3'-hydroxy-5,6,7,8,4'-pentamethoxyflavone; 3'-hydroxy-3,5,6,7,8,4'-hexamethoxyflavone; any comestibly acceptable salts of the foregoing; and any combinations thereof. Such pharmaceutical compositions can be in any suitable form for oral administration, such as tablets, lozenges, capsules, powders, liquid solutions, liquid suspensions, and the like. Such pharmaceutical compositions can include any suitable pharmaceutical excipients, binders, and the like, such as those set forth in Remington's Pharmaceutical Sciences. In some embodiments, the bitter-tasting pharmaceutical active ingredient is an ion channel inhibitor, such as a proton channel inhibitor. Other examples of bitter-tasting APIs whose bitterness is reduced by the one or more HMF compounds include, but are not limited to, atropine, brinzolamide, chloramphenicol, chloroquine, clindamycin, dexamethasone, digoxin, diltiazem, diphenhydramine, docusate, dorzolamide, doxepin, doxylamine, enalapril, erythromycin, esomeprazole, famotidine, gabapentin, ginkgolide A, guaifenesin, L-histidine, lomefloxacin, methylprednisolone, ofloxacin, oleuropein, oxyphenonium, pirenzepine, prednisone, ranitidine, trapidil, trimethoprim, and cetirizine.

Non-Animal Protein Materials and Products Made Therefrom

Products intended to replace or substitute meat or dairy products often rely on various non-animal-based materials, such as starches and proteins derived from plants, algae, fungi, or combinations thereof, to simulate the texture and flavor of meat or dairy. Non-limiting examples of non-animal-based proteins are plant proteins, such as soy proteins, pea proteins, bean proteins, grain proteins, and the like. Due to compositional differences between such non-animal-based materials and animal-derived materials, these products can present a bitter taste that consumers may find off-putting.

Thus, in certain aspects, the disclosure provides a flavored product comprising a plant-based material (such as a plant-based starch, a plant-based protein, or a combination thereof) and the HMF compound, or a comestibly acceptable salt thereof. In some further embodiments, the flavored product can include any features of combination of features set forth above for ingestible compositions that contain the HMF compound. In some embodiments, the flavored product is a beverage, such as soy milk, almond milk, rice milk, oat milk, a protein drink, a meal-replacement drink, or other like product. In some other embodiments, the flavored product is a meat-replacement product, such as a plant-based chicken product (such as a plant-based chicken nugget), a plant-based beef product (such as a plant-based burger), and the like. In some other embodiments, the flavored product is a protein powder, a meal-replacement powder, a plant-based creamer for coffee or tea, and the like. In certain further embodiments, any such products contain additional ingredients, and have additional features, as are typically used in the preparation and/or manufacture of such products. For example, such the HMF compound may be combined with other flavors and taste modifiers, and may even be encapsulated in certain materials, according to known technologies in the relevant art. Suitable concentrations of the HMF compound are set forth above.

In some embodiments, the flavored products comprise one or more plant-based proteins, which impart a bitter taste that is at least partially reduced by the use of the HMF compound in the product. Such plant-based proteins include, but are not limited to, pea protein, soy protein, canola (rapeseed) protein, chickpea protein, mycoproteins, algal proteins, fava protein, sunflower protein, wheat protein, In some alternative embodiments analogous to the above embodiments, algal or fungal proteins or starches are used instead, oat protein, potato protein, and the like. In some embodiments, these flavored products also include fiber to provide texture to the product. Fibers suitable for use include, but are not limited to, psyllium fiber, pea fiber, potato fiber, curdlan, soluble corn fiber (dextran and/or maltodextrin), *citrus* fiber, and combinations thereof. In such products, the HMF compound can be introduced in any suitable way. In some embodiments, the HMF compound is incorporated into a flavoring emulsion, such as a water-in-oil emulsion, along with other flavor-imparting ingredients.

Non-Meat Protein Materials and Products Made Therefrom

Certain non-meat animal proteins, such as dairy proteins and proteins from bone broth, are commonly used in food products, and are also sold as the primary ingredient in certain protein powders. Such proteins can impart bitter flavors that consumers may not desire. This is especially true for protein isolates, such as protein isolates of whey protein, collagen protein, casein proteins, and the like. Thus, the present disclosure provides ingestible compositions that include non-meat animal proteins and the HMF compound. The HMF compound, can be present in any suitable combination, according to the embodiments set forth in the preceding sections of the present disclosure. In some embodiments, the non-meat animal protein is a bone protein, such as a collagen protein derived from the bones of an animal, such as a cow, pig, donkey, horse, chicken, duck, goat, goose, rabbit, lamb, sheep, buffalo, ostrich, camel, and the like. In some embodiments, the non-meat animal protein is a milk protein, such as a whey protein, a casein protein, or any combination thereof. The milk can be the milk of any suitable animal, such as a cow, donkey, horse, sheep, buffalo, camel, and the like.

The HMF compound can also be included in certain food or beverage products that include animal milk or materials derived from animal milk. Such products include cheeses, cheese spreads, yogurt, kefir, milk, processed dairy products, cottage cheese, sour cream, butter, and the like.

EXAMPLES

To further illustrate this invention, the following examples are included. The examples should not, of course, be construed as specifically limiting the invention. Variations of these examples within the scope of the claims are within the purview of one skilled in the art and are considered to fall within the scope of the invention as described, and claimed herein. The reader will recognize that the skilled artisan, armed with the present disclosure, and skill in the art is able to prepare and use the invention without exhaustive examples.

Example 1—Synthetic Processes

*Aspergillus ficuum* or *Cunninghella elegans* was cultivated on a preparative scale. The second stage culture was incubated with substrate at a final concentration of 0.5 mg/mL. (See, e.g., the following: U.S. Pat. No. 9,840,789 B2; *J. Nat. Prod.* 2007, 70, 1035-1038; *J. Nat. Prod.* 2004, 67, 553-558; *J. Nat. Prod.* 2004, 67, 1876-1878; *J Chem. Technol. Biotechnol.* 2006, 81, 29-33; and *Chem Pharm Bull.* 2003, 51, 203). The progress of biotransformation reactions was monitored by LCMS analysis. After the reactions finished, the culture medium was collected and centrifuged. The supernatant was then extracted with ethyl acetate (EtOAc) twice, dried over anhydrous $Na_2SO_4$, and evaporated under reduced pressure. The EtOAc extracts were dried over $Na_2SO_4$, evaporated, dissolved in small volume of MeOH/EtOH for preparative HPLC purification.

A Gilson preparative HPLC-UV with water (solvent A) and acetonitrile (solvent B) were used for purification. A Phenomenex C18(2) column (150*21.20 mm*5 μm) was used for separation with a gradient elution from 50% B to 85% B. Peaks detected UV 335 nm were collected using a fraction collector.

Compound 101

65 mg of Compound 101 (4'-hydroxy-5,6,7,3'-tetramethoxyflavone) was isolated from metabolite of 0.4 g of 5,6,7,3',4'-pentamethoxyflavone, after incubated with *A. ficuum.*

Composition 2 Contains Compound 102 and Compound 108

33 mg of Composition 2 (blend of compound 102 (4'-hydroxy-3,5,6,7,3'-pentamethoxyflavone) with Compound 108 (3'-hydroxy-3,5,6,7,4'-pentamethoxyflavone) at weight ratio of 65:5), were isolated from metabolite of 0.5 g of 3,5,6,7,3',4'-hexamethoxyflavone, after incubated from *C. elegans.*

Compound 103

207 mg of Compound 103 (4'-hydroxy-5,6,7,8,3'-pentamethoxyflavone) was isolated from metabolite of 0.6 g of nobiletin, after incubated from *A. ficuum.*

Compound 104

64 mg of Compound 104 (4'-Hydroxy-5,6,7-trimethoxyflavone) was isolated from metabolite of 0.4 g of 5,6,7,4'-tetramethoxyflavone, after incubated from *A. ficuum.*

Composition 1 Contains Compound 105 and Compound 110

100.0 mg of Composition 1 (blend of compound 105 (4'-hydroxy-3,5,6,7,8,3'-hexamethoxyflavone) with compound 110 (3'-hydroxy-3,5,6,7,8,4'-hexamethoxyflavone) at weight ratio of 2:1), were isolated from metabolite of 0.5 g of 3,5,6,7,8,3',4'-heptamethoxyflavone, after incubated from *C. elegans.*

Compound 106

104 mg of Compound 106 (4'-hydroxy-5,6,7,8-tetramethoxyflavone) was isolated from metabolite of 0.5 g of tangeretin, after incubated from *A. ficuum.*

Compound 107 and Compound 109

Compound 107 (3'-hydroxy-5,6,7,4'-tetramethoxyflavone) and Compound 109 (3'-hydroxy-5,6,7,8,4'-pentamethoxyflavone) were obtained from commercial sources. The structures of the isolated product and purchased flavonoids were determined by NMR and MS spectroscopy.

Composition 3 Contains Compounds 101, 103, 104, and 106

608 mg of Composition 3 was prepared from metabolite of 1.0 g of polymethoxyflavone (PMF) extract prepared from *citrus* oil (PMF extract reference WO 2020/074436 A1 and WO 2020/025639 A1), after incubated with *A. ficuum*. The composition contains 13% of Compound 104, 5% of Compound 101, 16% of Compound 106, 21% of Compound 103, and other components include 3,5,6,7,3',4'-hexamethoxyflavone, 5,6,7,8,3',4'-hexamethoxyflavone, and 3,5,6,7,8,3',4'-hexamethoxyflavone. All these compounds sum up above 95%.

Composition 4 Contains Compounds 101, 103, 104, and 106

75 mg of Composition 4 was produced from 250 mg of PMF extract prepared from *citrus* oil (PMF extract reference WO 2020/074436 A1 and WO 2020/025639 A1), after incubation with *C. elegans*. The composition contains 22.5% of Compound 104, 6.7% of Compound 101, 13.9% of Compound 106, 28.2% of Compound 103, 4.5% of Compound 102 and compound 108, 24.2% of Compound 105 and Compound 110. All these compounds sum up above 95%.

Composition 5 Contains Compounds 102, 103, 104, and 108

122 mg of Composition 5 was produced from 1 g of PMF mixture which contains 3,5,6,7,3',4'-hexamethoxyflavone, 5,6,7,8,3',4'-hexamethoxyflavone, and 5,6,74'-tetramethoxyflavone, after incubation with *C. elegans*. The composition contains 41.4% of Compound 104, 44.8% of Compound 103, 13.8% of Compound 108 and Compound 102.

For all of the aforementioned mixture products, all PMF and hydroxylated PMF peaks were collected by preparative HPLC a fraction collector. PMF and their hydroxylated PMF peaks combined and dried to afford composition products.

Example 2—Sensory Testing

Certain HMF compounds were tasted by a human sensory panel to assess their ability to reduce bitterness, reduce astringency, and enhance sweetness. The panel consisted of 20 trained panelists evaluating the samples at 1 ppm, 5 ppm, or 10 ppm for taste properties (sweet, bitter, or astringent) on a scale of −5 to 5 (−5 denoted strong masking effect and 5 denoted strong enhancing effect, 0 being the intensity of a reference water solution containing 4% sucrose or 10 ppm mixture of Limonin, Naringin and Nomilin) The results are set forth in Table 2. The compound numberings ("Cpd") correspond to those set forth in Table 1. The composition numberings ("Cpn") are set forth above in Example 1.

TABLE 2

| Cpd/Cpn | Dosage (ppm) | Bitterness | Astringency | Sweetness |
|---|---|---|---|---|
| Cpd 101 | 10 | −0.92 | −0.92 | 0.58 |
| Cpd 103 | 10 | −1.17 | −0.67 | 0.17 |
| Cpd 104 | 10 | −1.00 | −0.33 | 0.08 |
| Cpd 106 | 5 | −2.00 | −0.30 | 0.25 |
| Cpd 107 | 1 | 0.08 | 0.00 | 0.50 |
| Cpd 109 | 10 | −3.51 | −1.80 | 0.03 |

TABLE 2-continued

| Cpd/Cpn | Dosage (ppm) | Bitterness | Astringency | Sweetness |
|---|---|---|---|---|
| Cpn 1 | 1 | −0.50 | 0.10 | 0.58 |
| Cpn 2 | 1 | 0.58 | 0.67 | 0.33 |
| Cpn 3 | 1 | −0.70 | −0.30 | 0.67 |
| Cpn 4 | 1 | −0.10 | 0.20 | 0.50 |
| Cpn 5 | 1 | −1.20 | 0.00 | 0.17 |

A panel consisted in 8 experts evaluating the samples at 10 ppm for taste properties (bitter and astringent) on a scale of −5 to 5 (−5 denoted strong masking effect and 5 denoted strong enhancing effect, 0 being the intensity of a reference application in coffee). The results are set forth in Table 3. The compound numberings correspond to those set forth in Table 1.

TABLE 3

| | Coffee | |
|---|---|---|
| Cpd | Bitterness | Astringency |
| 109 | −1.80 | 0.60 |

The invention claimed is:

1. A method of enhancing a sweet taste, reducing a bitter taste, reducing a sour taste, or reducing an astringent taste, of an ingestible composition, the method comprising introducing to the ingestible composition a flavor-modifying compound, wherein the flavor-modifying compound is selected from the group consisting of:
4'-hydroxy-5,6,7,3'-tetramethoxyflavone;
4'-hydroxy-3,5,6,7,3'-pentamethoxyflavone;
4'-hydroxy-5,6,7-trimethoxyflavone;
4'-hydroxy-3,5,6,7,8,3'-hexamethoxyflavone;
4'-hydroxy-5,6,7,8-tetramethoxyflavone;
3'-hydroxy-3,5,6,7,4'-pentamethoxyflavone;
3'-hydroxy-3,5,6,7,8,4'-hexamethoxyflavone;
any comestibly acceptable salts of the foregoing; and
any combination thereof.

2. The method of claim 1, wherein the flavor-modifying compound is present in the ingestible composition at a concentration ranging from 0.01 ppm to 1000 ppm, based on the total weight of the ingestible composition.

3. The method of claim 1, wherein the ingestible composition comprises one or more bitter compounds.

4. The method of claim 3, wherein the one or more bitter compounds comprise limonin, nomilin, naringin, or any combinations thereof.

5. The method of claim 4, wherein the ingestible composition is a *citrus* fruit juice.

6. The method of claim 3, wherein the ingestible composition is coffee, tea, fruit juice, or any combination thereof.

7. The method of claim 1, wherein the ingestible composition comprises one or more non-animal proteins.

8. The method of claim 1, wherein the ingestible composition comprises a sweetener.

* * * * *